Patented Oct. 22, 1968

3,407,182
RECOVERY OF POLYARYLENE SULFIDES
Robert A. Hinton, Bartlesville, Okla., assignor to Phillips Petroleum Company, a corporation of Delaware
No Drawing. Filed Aug. 1, 1966, Ser. No. 569,038
8 Claims. (Cl. 260—79)

ABSTRACT OF THE DISCLOSURE

Polyarylene sulfides are recovered from compositions comprising said polymers, alkali metal halides and polar organic solvents having a higher affinity for liquid ammonia than for said polymer by contacting said compositions with liquid ammonia.

---

This invention relates to the recovery of polyarylene sulfides. In one aspect, a polyarylene sulfide compound is recovered by treating a composition thereof with liquid ammonia. In another aspect, polyarylene sulfide compounds are separated from compositions thereof with alkali metal halides and polar organic solvents by contacting with liquid ammonia. In another aspect, alkali metal halides and polar organic solvents are separated from compositions thereof with polyarylene sulfide compounds by contacting with liquid ammonia after which the ammonia phase is heated to precipitate the alkali metal halide and flashed to separate the ammonia and polar organic solvents. In another aspect of this invention, a polyarylene sulfide compound having been contacted with liquid ammonia to remove a polar organic solvent and an alkali metal halide contained therein is again contacted with liquid ammonia, separated and flashed to produce purified polyarylene sulfide compound.

It is generally known in the polymer art that the ash or residue content of finished polymers may have a dramatic influence on their chemical, physical and electrical properties. As a result, it is usually desirable to remove, from the finished polymer, impurities produced in the reactor or present in the polymer for whatever reason. It is also necessary in the production of polymers to provide for the separation of polymer and diluent and/or unreacted monomer. The degree of purification desired and consequently the criticality of the separation techniques employed varies with the intended application of the finished polymer and the degree of adverse influence that results from the presence of minor amounts of diluent, catalyst residue, etc. in either the product or recycle process streams; i.e., diluents, etc.

The degree of these influences and the nature of the purification techniques employed is necesarily determined by the particular polymer or class of polymers, the nature of the particular catalyst residues and other impurities, and the characteristics of the polymerization diluent. For example, in the production of polyarylene sulfide compounds by the reaction of polyhalo-substituted aromatic compounds with alkali metal sulfides in the presence of a polar organic solvent, it is necessary to provide sufficient polymer recovery means for removing alkali metal halides produced during the reaction and the organic diluent from the finished polymer. The requirements of the polymer recovery and purification procedures employed in the production of these polyarylene compounds are critical due to the necessity of removing alkali metal halides from the polymer and the desirability of recovering and purifying the relatively expensive polar organic solvent.

It is therefore one object of this invention to provide a method for recovering polyarylene sulfide compounds from reaction systems in which they are produced. It is another object of this invention to provide a method for removing polar organic solvent and mineral impurities from polyarylene sulfide compounds. It is another object of this invention to provide a method of removing alkali metal halides and polar organic solvents from polyarylene sulfide compounds. It is yet another object of this invention to provide a method for recovering polar organic solvent from polyarylene sulfide compounds and purifying said solvent. It is yet another object of this invention to provide a method for extracting compositions of polyarylene sulfides to recover said sulfides. It is yet another object of this invention to provide a method for extracting compositions of polyarylene sulfides in polar organic solvents to purify said sulfides and to recover said solvents. It is yet another object of this invention to recover polar organic solvents from compositions thereof with polyarylene sulfides. It is yet another object of this invention to provide a method for recovering and purifying polar organic solvents employed in the production of polyarylene sulfide compounds.

Other aspects, objects and the advantages of this invention will be apparent to one skilled in the art in view of the following disclosure and the appended claims.

The production of the polyarylene sulfide compounds to which this invention relates is disclosed in our copending application having Ser. No. 327,143 filed Nov. 27, 1963 now Patent No. 3,354,129. The production, utilization and treatment of these compounds is further described in our copending application having Ser. No. 492,333 filed Oct. 1, 1965 as a continuation-in-part of Ser. No. 327,143 now Patent No. 3,354,129.

According to said copending applications, arylene sulfide polymers can be prepared in high yield by reacting at least one polyhalo-substituted cyclic compound containing unsaturation between adjacent ring atoms and wherein the halogen atoms are attached to ring carbon atoms with an alkali metal sulfide in a polar organic compound at an elevated temperature. Generally the polar organic compound will substantially dissolve both the alkali metal sulfide and the polyhalo-substituted aromatic compound, or other compound which may be present.

The polymers produced by the process of said copending application will vary considerably, depending upon the chosen reactants. Some are high melting thermoplastic materials having excellent high temperature stability, while others can be much lower in molecular weight, including liquids and grease-like materials. The melting point or softening point of these polymers can range all the way from liquids at 25° C. to polymers melting above 400° C. These polymers can be cured, i.e., heat treated in the absence of oxygen or with an oxidizing agent, either under vacuum or at atmospheric or superatmospheric pressures, to increase the molecular weight by either a lengthening of a molecular chain or by cross-linking or by a combination of both to improve such properties as tensile strength. Such treatment can be effected, for example, by heating the polymer preferably to a temperature above its melting point, in some cases as high as 250 to 500° C. Such heat treatment can be carried out while contacting the polymer with air or under vacuum or under an inert gas such as nitrogen.

The polymers produced by the process of said copending application can be molded into a variety of useful articles by molding techniques which are well known in the art. Molding should be carried out above the melting point or softening point but below the decomposition point of the particular polymer being molded. Suitable molding techniques include injection molding, compression molding, vacuum forming, extrusion and the like. The polymers can be molded directly after recovery from the reaction zone in which they are prepared, or such polymers can be subjected to a heat treatment as described above prior to molding. In a further aspect, according to said copending application, heat treatment below the softening point can be utilized for molded items.

In accordance with one embodiment of this invention there is provided a method for separating arylene sulfide polymers from solutions thereof with polar organic solvents and alkali metal halides, which method comprises contacting the compositions with liquid ammonia in sufficient quantity to promote the resolution of first and second phases. The polyarylene sulfide, usually in solid form, comprises the predominance of the more dense phase while the less dense or ammonia phase contains the polar organic solvent and the principal amount of the alkali metal halide. The precipitated arylene sulfide polymer can be removed from the solvent extraction zone and subjected to reduced pressure to remove ammonia contained therein, or, if it is desired to further purify the polymeric product by removing therefrom additional alkali metal halide, a plurality of contacting stages can be provided.

The less dense phase comprising ammonia, polar organic solvent, and most of the alkali metal halide contained in the feed to the extraction zone is separated from the more dense arylene sulfide polymer phase and is heated to a temperature in excess of the initial contacting temperature to cause the precipitation of alkali metal halide therefrom. This method of halide removal is possible due to the fact that the affinity of liquid ammonia for alkali metal halide is maximum at a relatively low temperature. As a result, if the halide concentration in the ammonia approaches saturation at this lower temperature, the halide can be caused to precipitate by increasing the temperature of the solution. For example, the maximum solubility of sodium chloride in liquid ammonia is realized at about 0° F., which is the optimum temperature at which to effect the initial extraction of sodium chloride from the sulfide containing solution. However, this initial contacting step can be effected at any feasible operating temperature. It is desirable, of course, that the temperature in the extraction zone be equal to or greater than the temperature of the maximum saturation, e.g., about 0° F. in order to realize the greatest efficiency in the subsequent alkali metal halide precipitation step. In the presently preferred embodiment of this invention, the arylene sulfide polymer containing composition is contacted with ammonia at a temperature in the range of from about −10° F. to about 100° F. The volume ratio of liquid ammonia extract to original composition is preferably within the range of from about 1:1 to about 5:1 depending upon the relative concentrations of arylene sulfide polymer, polar organic solvent, and alkali metal halide.

The volume ratios of arylene sulfide polymer to polar organic solvent in the feed to the extraction zone are usually within the range of from about 0.1:1 to about 0.5:1 and the concentration of alkali metal halide is usually within the range of from about 5 to about 25 weight percent on composition feed.

The ammonia solution of polar organic solvent, for example, N-methylpyrrolidone, and alkali metal halide, for example, sodium chloride, is passed to a chloride precipitation zone wherein the temperature of the solution is increased by an amount within the range of from about 50 to about 200° F. to effect the precipitation of preferably a major part of the sodium chloride contained therein. The sodium chloride is removed from the settling zone in solid form and can be flashed to remove ammonia and organic solvent contained therein. The ammonia phase, contained at a pressure sufficient to maintain liquid phase at operating temperatures, is removed and flashed or fractionated to separate the ammonia and N-methyl-pyrrolidone for recycle to the primary extraction zone and polymerization reactor, respectively.

During the primary extraction in which the arylene sulfide polymer is precipitated from solution, it is usually preferable to provide in the composition a minor amount of a suitable surfactant to expedite the separation of the solid arylene sulfide polymer phase. Suitable surfactants are, for example, Tamol-731 (the sodium salt of maleic anhydride-isobutylene copolymer), Triton X-200 (sodium salt of alkyl aryl polyester sulfonate), sulfated alcohols and alcohol derivatives, Duponol OS (fatty alcohol amine sulfate), Nopco 2031 (sulfated hydroxy stearic acid), Marasperse (calcium lignosulfate) plus many others readily available. This procedure is particularly advantageous where linear polymers are to be separated in that I have found that the settling rate of linear arylene sulfide polymers in such systems is considerably less than the settling rate of cross-linked polyarylene sulfides. As a result, the amount of surfactant material added to the original composition will depend upon the characteristics of the arylene sulfide polymer, i.e., the degree of linearity, operating conditions, ammonia/solution volume ratios, and the desired separation time. Normally, however, surfactants concentration within the range of from about 0.001 to about 0.1 weight percent on polymer solution are satisfactory.

The polyhalo-substituted compounds which can be employed as primary reactants according to said copending application are represented by the formulas:

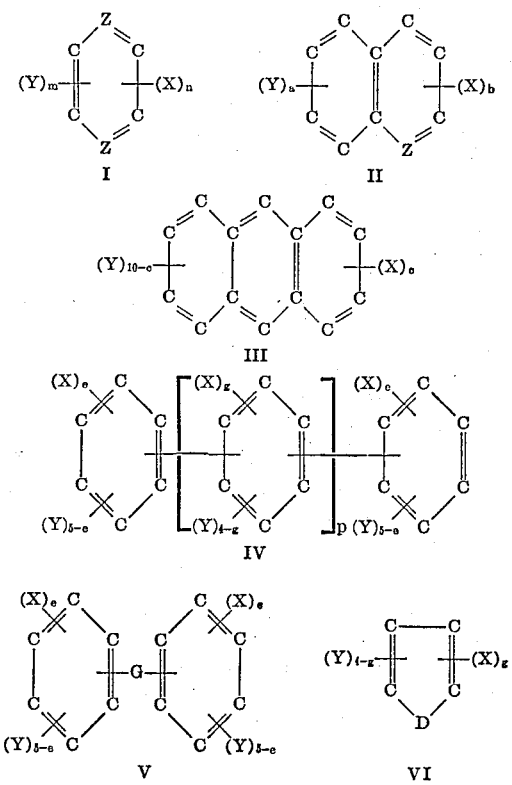

wherein each X is a halogen selected from the group consisting of chlorine, bromine, iodine, and fluorine, preferably chlorine and bromine, each Y is selected from the group consisting of hydrogen, —R, —N(R)₂,

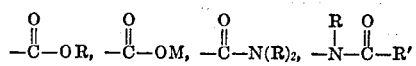

—O—R', —S—R', —SO₃H, and —SO₃M, wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

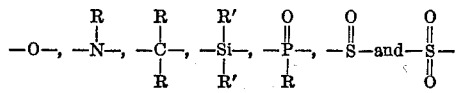

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said copending application are represented by the formula $M_2S$ wherein M is as defined above, and includes the monosulfides of sodium, potassium, lithium, rubidium and cesium, including the anhydrous and hydrated forms of these sulfides. The preferred sulfide reactant is $Na_2S$ and its hydrates. This sulfide can be purchased having 9 mols of water of hydration per mol of $Na_2S$, or it can be obtained containing about 60–62 weight percent $Na_2S$ and about 38–40 weight percent water of hydration.

The polar organic compounds which are employed as reaction media in the process of said copending application should be solvents for the polyhaloaromatic compounds and the alkali metal sulfides. Representative examples of suitable classes of compounds include amides, lactams, sulfones, and the like. Specific examples of such compounds are hexamethylphosphoramide, tetramethylurea, N,N'-ethylene dipyrrolidone, N-methyl-2-pyrrolidone (NMP), pyrrolidone, caprolactam, N-ethylcaprolactam, sulfolane, dimethylacetamide, low molecular weight polyamides and the like.

Some specific examples of polyhalo-substituted compounds of the above general formulas which can be employed in the process of said copending application are:

1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4-trichlorobenzene
1,2,4,5-tetrabromobenzene
hexachlorobenzene
1-n-butyl-2,5-dichlorobenzene, and the like.

Example I

A composition comprising 10 parts linear polyphenylene sulfide, 10 parts NaCl and 75 parts N-methyl-pyrrolidone was contacted at 75° F. with 540 parts $NH_3$ at a pressure of 125 p.s.i.g. to produce a solid polymer phase which was flashed and air dried to produce a finished polymer having therein 0.08 weight percent NaCl. The ammonia phase containing 75 parts N-methyl-pyrrolidone, 10 parts NaCl, and 400 parts ammonia was warmed to a temperature of 200° F. to precipitate 75 weight percent of the salt contained therein which was recovered, flashed and dried. The supernatant liquid containing 4.5 weight percent NaCl was flashed at a pressure of 15 p.s.i.g. and a temperature of 0° F. to remove ammonia. The remaining N-methyl-pyrrolidone solution contained 0.01 weight percent ammonia and 0.01 weight percent NaCl.

In commercial operation, the ammonia recovered from the flash operation is condensed, compressed and recycled to the primary extraction column. The N-methyl-pyrrolidone solution produced in the flashing operation can be further purified by fractionation, if desired, and recycled to the polymerization reactor as diluent.

The polymer settling rate in Example I was observed to be low. As above mentioned, it is often advantageous to accelerate the polymer settling rate by adding a minor amount of surfactant to the ammonia extraction zone. This advantage is illustrated by the following example.

Example II

A polyphenylene sulfide composition identical to that of Example I but containing 0.01 weight percent of Tamol–731 surfactant was contacted at 75° F. with ammonia. The polymer particle settling rate was observed to be 3 inches per minute representing a several fold increase as compared to the operation in which surfactant was not employed.

In an alternate embodiment, the ammonia extraction or polymer precipitation can be conducted in two or more series operations. For example, the polymer composition can first be contacted with recycle liquid ammonia containing only a negligible amount of alkali metal halide at a temperature within the range of from about —10° F. to about 100° F. to produce a first extract phase containing from about 0.1 to about 1.0 weight percent alkali metal halide and about 95 percent of the N-methyl-pyrrolidone present in the polymer solution feed. The polymer composition thus extracted is passed to a second zone wherein it is contacted with additional recycle ammonia having, for example, 4.5 weight percent sodium chloride therein and finally with pure ammonia, to produce a combined extract phase containing about 15 percent NaCl and about 1 weight percent N-methyl-pyrrolidone. The precipitated polymer is recovered, flashed and dried as above described. The second extract phase having a high alkali metal halide content is heated to precipitate salt as above described, after which it is flashed to separate ammonia and N-methyl-pyrrolidone, both of which are recycled. The first extract phase containing a small amount of sodium chloride can be flashed to recover ammonia as overhead which is condensed, compressed and recycled to the polymer recovery zone and the N-methyl-pyrrolidone product is further purified by fractionation and recycle to the polymerization reaction.

Numerous variations and modifications of the concept of this invention will be apparent to one skilled in the art in view of the foregoing disclosure and the appended claims to this invention, the essence of which is that there is provided a method for recovery of arylene sulfide polymers from compositions thereof with polar organic solvents and alkali metal halides by contacting said mixtures with liquid ammonia in sufficient quantities to produce a concentrated arylene polymer phase and an ammonia phase comprising polar organic solvent and alkali metal halide.

I claim:

1. A method of separating a polyarylene sulfide from a composition thereof with an alkali metal halide and a polar organic solvent having higher affinity for liquid ammonia than said sulfide and selected from amides, lactams, and sulfones, which method comprises contacting said composition with liquid ammonia in sufficient quantity to produce first and second phases, said first phase comprising said sulfide, and said second phase comprising ammonia, said organic solvent and said alkali metal halide.

2. The method of claim 1 wherein said composition is produced by reacting at least one compound selected from the group consisting of:

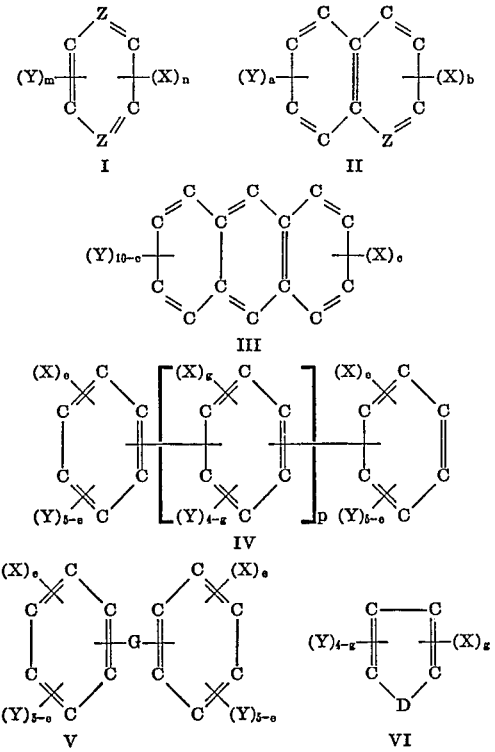

wherein each X is a halogen selected from the group consisting of chlorine, bromine, iodine, and fluorine, preferably chlorine and bromine, each Y is selected from the group consisting of hydrogen,

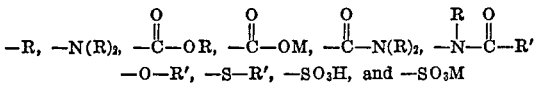

wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S— and

G is selected from the group consisting of

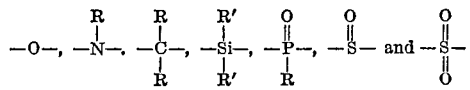

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1 with an alkali metal sulfide in a polar organic compound at an elevated temperature for a time sufficient to obtain said polymer.

3. The method of claim 1 wherein said composition and ammonia are contacted at a relatively low temperature within the range of from about —10 to about 100° F., said first and second phases are separated, and the temperature of said second phase is increased by an amount sufficient to cause said alkali metal halide to precipitate from the second phase.

4. The method of claim 3 wherein the amount by which the temperature of said second phase is increased is within the range of from about 50 to about 200 F. degrees.

5. The method of claim 1 wherein the said first phase is further contacted with additional liquid ammonia at a temperature within the range of from about —10 to about 100° F. to further reduce the alkali metal halide content therein.

6. The method of claim 1 wherein the said solvent is N-methyl-pyrrolidone, said alkali metal halide is sodium chloride.

7. The method of claim 1 wherein the ratio of the volumes of said ammonia to said composition is within the range of from about 1:1 to about 5:1.

8. The method of claim 1 wherein a minor amount of a surfactant material is provided in the said composition, the said minor amount being sufficient to increase the rate at which said phases separate.

References Cited

UNITED STATES PATENTS 3,268,504   8/1966   Harris et al. _____ 260—79

OTHER REFERENCES

Sisler, Chemistry in Non-Aqueous Solvents, Reinhold Publishing Co., New York, 1961, pp. 26 to 36.

DONALD E. CZAJA, *Primary Examiner.*

M. I. MARQUIS, *Assistant Examiner.*